(No Model.)
C. W. VOGEL & H. BEITZELL.
CORN PLANTER.
No. 254,444. Patented Feb. 28, 1882.
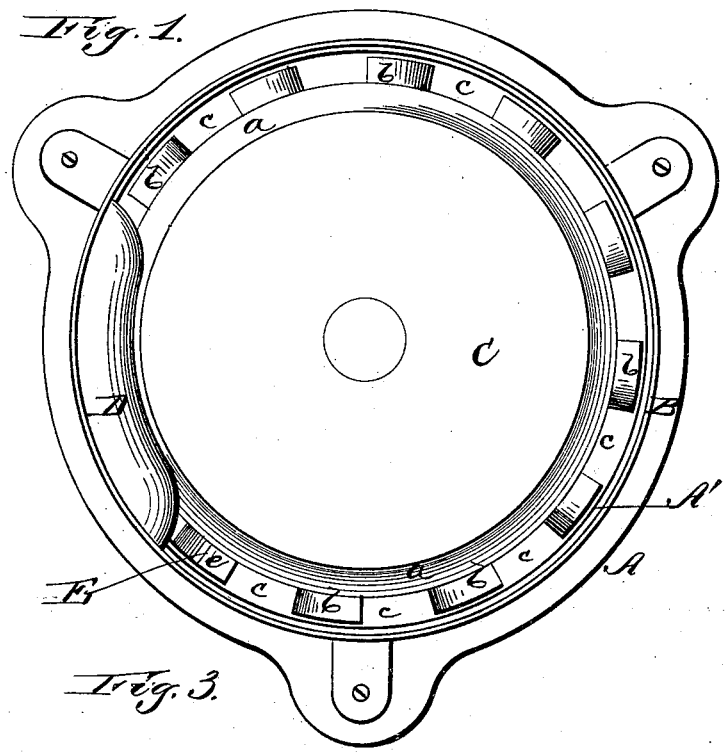
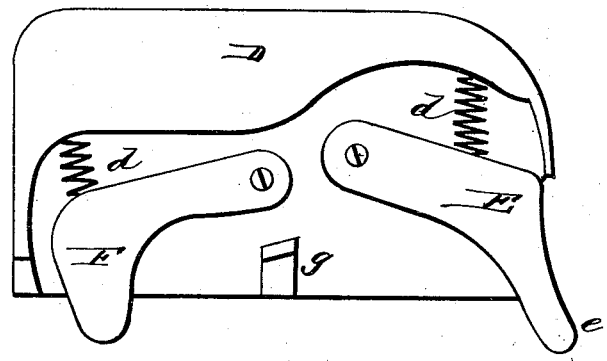
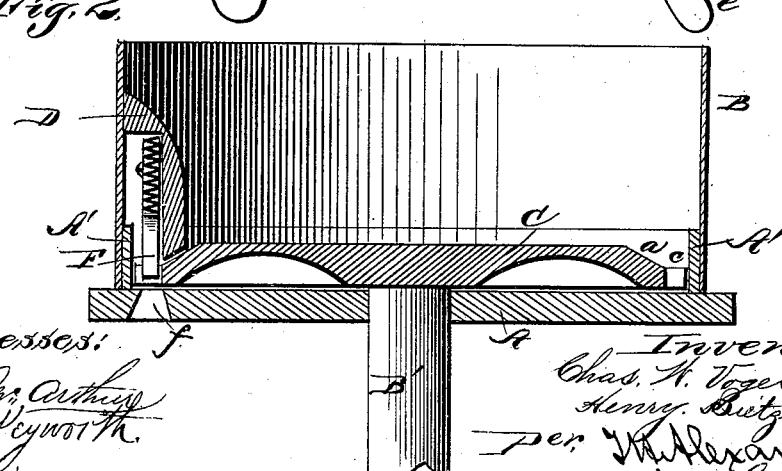
Witnesses:
Inventors,
Chas. W. Vogel
Henry Beitzell,
per Jn. Alexander
Attorney.

UNITED STATES PATENT OFFICE.

CHARLES W. VOGEL AND HENRY BEITZELL, OF CENTREVILLE, INDIANA; SAID BEITZELL ASSIGNOR TO ANNA M. BEITZELL, OF SAME PLACE.

CORN-PLANTER.

SPECIFICATION forming part of Letters Patent No. 254,444, dated February 28, 1882.

Application filed October 22, 1881. (No model.)

*To all whom it may concern:*

Be it known that we, CHARLES W. VOGEL and HENRY BEITZELL, of Centreville, in the county of Wayne and State of Indiana, have invented certain new and useful Improvements in Corn-Planters; and we do hereby declare that the following is a full, clear, and exact description thereof, reference being had to the accompanying drawings, and to the letters of reference marked thereon, which form part of this specification.

Figure 1 is a top view of the new corn-dropper. Fig. 2 is a diametrical section of Fig. 1. Fig. 3 is a view of the inside of the shield and its spring actuated-fingers detached from the hopper.

Our invention relates to corn-planters having cylindrical hoppers, in which revolve a cellular discharging-disk; and the nature of our invention consists in the combination of spring-actuated fingers, an inclosing-shield therefor, and means for preventing the hopper-flange from being indented, so as to stop the working of the said fingers, as will be understood from the following description.

A designates a cast-metal hopper-base, which is formed with an annular flange, A', and provided with a cylindrical hopper, B, preferably made of sheet metal, and secured to the base in any suitable manner.

C is the rotary distributing-wheel, fixed to a central shaft, B', which passes through the hopper-base, and which may receive rotation by any convenient means. The wheel C is constructed with a beveled edge, $a$, terminating at the circumference of this wheel in lugs or teeth $b$, each one of which has a rounded or beveled end. The lugs or teeth are equidistant from each other, and are arranged to leave seed-cells $c$ between them, which are all of the same size, and of such size as to receive a given number of grains of corn. The flange A' forms the outer wall of the seed-cells, as shown in Figs. 1 and 2.

D designates a cellular shield, which is rigidly secured to the cylinder B, and rounded so as not to afford lodgment for the grains of corn. In this shield we pivot two fingers, E F, which are depressed by springs $d\,d$. One end of the shield is cut away to allow free play to the curved edge $e$ of the cut-off finger E and to expose this edge to the corn in the hopper. This will prevent the grains from being cracked as they pass into the shield to be discharged from the hopper through the outlet $f$. The finger E receives vibration by its rounded end riding over the teeth or lugs $b$ as the seed-cells successively pass under said end, and as this takes places the finger acts as a cut-off or clearer to insure only the required number of grains of corn being carried in the cells into the shield. The discharge-finger F is formed with a tapered rounded end, which plays in the charged seed-cells and by its spring action insures the free discharge of the grains from each passing cell. Between the two fingers, and on a level with the tops of the seed-cells, is a lug, $g$, (shown in Fig. 3,) which will prevent the thin wall of the hopper from being indented at this point and interfering with the free vibration of the two spring-actuated fingers E F. The lug $g$ serves as a brace for the wall of the hopper between the two fingers E F. It is obvious that if the wall were pressed inward (indented) at this point it would bind the said fingers and prevent them from working.

It will be seen by reference to Fig. 2 that the wheel C is the frustum of a cone, and that the annular inclined edge $a$ is very short, terminating in the peripheral seed-cells $c$. It will also be seen that the top of the wheel included within said inclined or beveled edge is flat and horizontal. The effect of this construction is that the weight of the greater mass of corn in the hopper is supported upon the flat face of said wheel, and will not crowd the bottom grains with undue force into the cells $c$. A conical wheel would cause the weight of the corn in the hopper to press downward and outward with such force (if the hopper be full, or nearly so) as to clog the cells and the machine. The wheel with flat top, beveled edge, and peripheral cells overcomes the objections named.

Having thus fully described our invention, what we claim as new, and desire to secure by Letters Patent, is—

The combination of the shield D, the spring-actuated fingers therein, the hopper-flange, and the bracing-lug $g$, for the purpose specified.

In testimony that we claim the foregoing as our own we affix our signatures in presence of two witnesses.

CHARLES W. VOGEL.
HENRY BEITZELL.

Witnesses:
JAMES H. GENTRY,
DAVID GENTRY.